(12) United States Patent
Feng et al.

(10) Patent No.: US 8,786,864 B2
(45) Date of Patent: Jul. 22, 2014

(54) CIRCULAR COMMON-PATH POINT DIFFRACTION INTERFERENCE WAVEFRONT SENSOR

(75) Inventors: Guoying Feng, Chengdu (CN); Yongzhao Du, Chengdu (CN); Shouhuan Zhou, Chengdu (CN)

(73) Assignee: Sichuan University, Chengdu, Sichuan Province (CN)

( * ) Notice: Subject to any disclaimer, the term of this patent is extended or adjusted under 35 U.S.C. 154(b) by 428 days.

(21) Appl. No.: 13/303,163

(22) Filed: Nov. 23, 2011

(65) Prior Publication Data

US 2012/0140242 A1 Jun. 7, 2012

(30) Foreign Application Priority Data

Dec. 7, 2010 (CN) .......................... 2010 1 0577125

(51) Int. Cl.
*G01B 9/02* (2006.01)

(52) U.S. Cl.
USPC ............................ 356/521; 356/513; 356/515

(58) Field of Classification Search
CPC ............... G01J 2009/0223; G01J 2009/002; G01J 9/02; G01B 9/02097; G01B 9/02043; G01B 9/02038
USPC .......................................... 356/521, 513, 515
See application file for complete search history.

(56) References Cited

U.S. PATENT DOCUMENTS

| 7,477,448 B2 * | 1/2009 | Rygiel ........................ 359/370 |
| 7,583,422 B2 * | 9/2009 | Mizushima et al. .............. 359/3 |
| 7,633,631 B2 * | 12/2009 | Fukutake ....................... 356/521 |
| 7,869,106 B2 * | 1/2011 | Tsukagoshi et al. ............ 359/24 |
| 2014/0078566 A1 * | 3/2014 | Rosen ............................. 359/30 |

* cited by examiner

*Primary Examiner* — Tarifur Chowdhury
*Assistant Examiner* — Jonathon Cook

(57) ABSTRACT

A circular common-path point diffraction interference wavefront sensor includes an optical matching system, a beam-splitter, a first reflection mirror, a second reflection mirror, a first Fourier lens, a second Fourier lens, a charge-coupled device (CCD) detector, a computer system, and a two-pinhole mask having a reference pinhole and a testing window and placed at a confocal plane of the first Fourier lens and the second Fourier lens. A testing beam is divided into two beams through the beam-splitter. One beam makes the pinhole diffraction by the reference pinhole, thereby producing the approximately ideal plane wave as the reference wave. Another beam passes through the testing window almost without any attenuation as the signal wave. The spatially linear carrier frequency is introduced by adjusting the tilt angle of the beam-splitter. The present invention is adapted for all kinds of dynamic and static detection field of wavefront phase.

20 Claims, 3 Drawing Sheets

CIRCULAR COMMON-PATH POINT DIFFRACTION INTERFERENCE WAVEFRONT SENSOR

BACKGROUND OF THE PRESENT INVENTION

1. Field of Invention

The present invention relates to a self-reference interference wavefront sensing technology, and more particularly to a circular common-path point diffraction interference wavefront sensor. It belongs to the optical detection technology field.

2. Description of Related Arts

It is always needed for the real-time diagnosis of the distortion wavefront, the surface detection of the optical components, the laser beam purification in the laser adaptive optical system and the high-power laser system to measure the wavefront phase distribution of the light wave. The commonly used wavefront sensing technology comprises the Shack-Hartmann wavefront sensing technology, the curvature wavefront sensing technology and the self-reference interference wavefront sensing technology. The basic principle of the Shack-Hartmann wavefront sensor is that the incident wavefront is divided into several sub-wavefronts using the microlens array, and then the centroid offset of the focused spot of every sub-wavefront obtained via respective micro-lens is measured by the two-dimensional array photo-detector for obtaining the slope of wavefront under test, and finally the phase distribution of the testing wavefront is obtained by wavefront reconstruction algorithm. The Shack-Hartmann wavefront sensor has the convenient calibration and simple structure. Its wavefront recovery process can be completed through the linear matrix operations. Therefore, it can achieve the real-time measurement and is a widely used wavefront sensor. However, the measurement accuracy of the Shack-Hartmann wavefront sensor is limited by the spatial resolution thereof. Compared with the Shack-Hartmann wavefront sensor, the curvature wavefront sensing technology has some important advantages as below. The wavefront curvature distribution signal obtained by the curvature wavefront sensor can be directly used to control the wavefront correction system for correcting the distortion wavefront of testing laser beam without the complex operations in the Shack-Hartmann wavefront sensor, thereby quickening the feedback speed. However, the curvature wavefront sensor is only adapted for detecting the lower spatial frequency of the distortion wavefront, and the accuracy of the curvature wavefront sensor is lower than that of the Shack-Hartmann wavefront sensor for the higher spatial frequency of the distortion wavefront.

The self-reference interferometer, as the wavefront measurement technology, has played an important role in the optical system and the laser beam characterization field. The point diffraction interferometer (PDI) is a common-path interferometer with the simple structure, which is firstly proposed by R. N. Smartt in 1972. The basic principle of the PDI is shown in FIG. 1. A small light-through pinhole with the proper size is placed at a semitransparent plate, thereby forming a pinhole mask which is placed at the focal plane of the convergent lens. When the diameter of the small light-through pinhole is small enough, the reference wave which is approximately considered as the ideal spherical wave can be formed by the pinhole diffraction. The wavefront through the semitransparent plate contains the phase information of the testing wavefront. By analyzing the interference fringes produced by the reference wave and the signal wave, the phase distribution of wavefront under test can be reconstructed. However, the reference wave and the signal wave of the conventional point diffraction interferometer almost keep the same geometrically optical axis, and produce the interferogram which generally includes the few fringes, thus the Fourier analytics cannot be used to extract the phase information of wavefront under test. Also, due to the common-path structure, it is difficult for the conventional point diffraction interferometer to introduce the phase shift between the reference wave and the signal wave.

In 1964, M. V. R. K. Murty proposed another self-reference interferometer, namely, the cyclic radial shearing interferometry (CRSI) in the literature of "A compact radial shearing interferometer based on the law of refraction, Appl. Opt, 3(7):853-858 (1964)", in which the wavefront under test are respectively zoomed in and zoomed out by the CRSI, and then produce the interference within the superposition area thereof, so that the phase distribution of the distortion wavefront is extracted from the interference fringe. Due to the common-path structure without the special reference wave, the CRSI is insensitive to the environmental vibration. Therefore, the CRSI can be applied under the bad operational environment, and especially, the spatial phase modulation technology is introduced, thus it is easy to extract the phase information of the testing wavefront, namely, the overall detection of the distortion wavefront can be achieved by a single interferogram, and has the higher accuracy, so the CRSI has the great advantage in the transient wavefront detection field. A. R. Barnes and L. C. Smith disclosed that the output wavefront of the near field and the far field for the large aperture laser system is detected based on the CRSI in the literature of "A combined phase, near and far field diagnostic for large aperture laser system, Proc. SPIE. 3492, 564-572 (1999)". The tested wavefront of the CRSI is zoomed in and zoomed out by the telescope system, so for the slowly varying wavefront, when the amplification of the telescope system is large enough, the expanded wavefront can be considered as the ideal plane wave. When the phase distribution of the tested wavefront is complex, even the amplification of the telescope system is increased; it is difficult to obtain the ideal reference plane wave. Therefore, the wavefront phase extracted from the interference fringes reflects essentially the phase difference between the zoomed-in wavefront and the zoomed-out wavefront instead of the actual phase distribution. To obtain the actual phase distribution of the testing wavefront, Tsuguo Kohno et al disclosed the wavefront phase iterative algorithm for reducing the error in the literature of "Radial shearing interferometer for in-process measurement of diamond turning, Opt. Eng. 39(10):2696-2699 (2000)". Subsequently, combined with the condition that the zoomed-in wavefront and the zoomed-out wavefront have the relative translation, Da-hai Li et al obtains a wavefront phase iterative algorithm which is more close to the practical applications in the literature of "Improved formula of wavefront reconstruction from a radial shearing interferogram, Opt. Lett. 33(3): 210-212 (2008)", thereby further improving the detecting accuracy of the wavefront phase. However, if the error corrections want to reach the higher accuracy by the iterative algorithm, the more sampling points of the wavefront phase must be reconfigurable computed. Accordingly, the computational complexity is very large. Therefore, the applications in the line measurement, the transient wavefront detection and other fields are limited.

SUMMARY OF THE PRESENT INVENTION

An object of the present invention is to provide a circular common-path point diffraction interference wavefront sensor which adopts the circular common-path structure and introduces the spatially linear carrier frequency between the reference wave and the signal wave.

Another object of the present invention is to provide a circular common-path point diffraction interference wavefront sensor with the strong stability, wherein no special reference wave is needed, only a single spatial carrier frequency interference fringe is needed, the phase distribution of the tested wavefront can be quickly and accurately reconstructed without any iterative process.

Another object of the present invention is to provide a circular common-path point diffraction interference wavefront sensor, which is capable of improving the detection speed, and is adapted for all kinds of static and dynamic wavefronts' high-precision detections application field.

The basic idea of the present invention is to provide a new circular common-path point diffraction interference wavefront sensor which adopts the circular common-path structure, introduces the spatially linear carrier frequency between the reference wave and the signal wave and can quickly and accurately reconstruct the phase distribution of the tested wavefront by the spatial phase modulation technology. The circular common-path point diffraction interference wavefront sensor comprises an optical matching system, a beam-splitter, a first reflection mirror, a second reflection mirror, a first Fourier lens, a second Fourier lens, a charge-coupled device (CCD) detector, a computer system, and a two-pinhole mask having a reference pinhole and a testing window. Based on the optical path, the testing beam is divided into two beams by the beam-splitter. The transmitted beam is reflected by the first reflection mirror, and then enters into the first Fourier lens and passes through the testing window of the two-pinhole mask at a focal plane of the first Fourier lens with almost no attenuation, and then enters into the second Fourier lens forming a reduced beam, and then is reflected by the second reflection mirror, and then returns again to the beam-splitter as a signal wave containing all information of the testing beam. The testing window acts as the channel of the signal wave and eliminates the effect of the environmental stray light. The reflected beam is reflected by the second reflection mirror, and then enters into the second Fourier lens and makes the pinhole diffraction by the reference pinhole on the two-pinhole mask at the focal plane of the first Fourier lens. When the diameter of the reference pinhole is small enough, the diffraction beam can be regarded as the ideal spherical wave. The ideal spherical wave is expanded by the first Fourier lens and forming the approximately ideal plane wave, and then is reflected by the first reflection mirror, and then is reflected again by the beam-splitter as a reference wave and introduces the spatially linear carrier frequency by adjusting the tilt angle of the beam-splitter. Finally, the spatially carrier frequency interference fringes containing all information of the tested wavefront, formed by the signal wave and the reference wave at the superposition region thereof, are received by the CCD detector and then sent to the computer system for processing. Therefore, the actual phase information of the tested wavefront can be directly recovered by the single spatially carrier frequency interference fringe, so that the complex iterative process of existing wavefront phase iterative algorithm is avoided, thereby improving the detection accuracy and speed of the wavefront.

Accordingly, in order to accomplish the above objects, the present invention provides a circular common-path point diffraction interference wavefront sensor, comprising:

an optical matching system, a beam-splitter, a first reflection mirror, a second reflection mirror, a first Fourier lens, a second Fourier lens, a charge-coupled device (CCD) detector, a computer system, and a two-pinhole mask having a reference pinhole and a testing window, wherein the two-pinhole mask is placed at a confocal plane of a telescope system consisting of the first Fourier lens and the second Fourier lens, wherein a testing beam from the optical matching system is divided into two beams, named transmitted beam and reflected beam through the beam-splitter, wherein the transmitted beam is reflected by the first reflection mirror, and then enters into the first Fourier lens and passes through the testing window of the two-pinhole mask at a focal plane of the first Fourier lens, and then enters into the second Fourier lens forming a reduced beam, the reduced beam is reflected by the second reflection mirror and then returns again to the beam-splitter as a signal wave, wherein the reflected beam is reflected by the second reflection mirror, and then enters into the second Fourier lens and makes a pinhole diffraction by the reference pinhole on the two-pinhole mask, the diffracted beam is expanded by the first Fourier lens, the expanded beam is reflected by the first reflection mirror and then is reflected again by the beam-splitter as a reference wave, wherein the signal wave and the reference wave interfere at a superposition region thereof forming interference fringes.

In the circular common-path point diffraction interference wavefront sensor mentioned above, the beam-splitter is a plate beam-splitter or a beam-splitter cubes which not only splits the beam, but also introduces the spatially linear carrier frequency between the reference wave and the signal wave.

In the circular common-path point diffraction interference wavefront sensor mentioned above, to produce the approximately ideal spherical wave, the reference pinhole, provided on the two-pinhole mask, has the aperture of the magnitude of Airy disc diameter.

In the circular common-path point diffraction interference wavefront sensor mentioned above, the testing window on the two-pinhole mask is a round or square hole which acts as the channel of the signal wave and eliminates the effect of the environmental stray light.

In the circular common-path point diffraction interference wavefront sensor mentioned above, the testing window on the two-pinhole mask has an aperture diameter of 0.2-2 mm.

In the circular common-path point diffraction interference wavefront sensor mentioned above, the first reflection mirror and the second reflection mirror are the laser line dielectric HR Mirrors.

In the circular common-path point diffraction interference wavefront sensor mentioned above, the first Fourier lens and the second Fourier lens are the positive Fourier lenses.

Compared with the prior art, the circular common-path point diffraction interference wavefront sensor of the present invention has some characteristics and beneficial effects as follows.

1. Compared with the conventional Shack-Hartmann wavefront sensor, in the circular common-path point diffraction interference wavefront sensor of the present invention, every pixel of the CCD detector can be considered as a sub-aperture, so every pixel point is corresponding to the respective wavefront component, thereby improving the detection accuracy and the spatial resolution of the wavefront.

2. By adjusting the tilt angle of the beam-splitter in the circular common-path point diffraction interference wavefront sensor of the present invention, the spatially linear carrier frequency is introduced between the signal wave and the reference wave for obtaining the spatial carrier frequency interference fringes. Therefore, the phase information of the tested wavefront can be quickly and accurately recovered by the spatial phase modulation technology based on the fast Fourier transform.

3. In the circular common-path point diffraction interference wavefront sensor of the present invention, a beam of copy wave makes the pinhole diffraction and then is considered as an approximately ideal reference wave, the phase information obtained from the recovery of the interference fringes is the actual phase information of the tested wavefront. Therefore, the complex iterative process in the conventional cyclic radial shearing interferometer is not needed in the circular common-path point diffraction interference wavefront sensor of the present invention, which improves the wavefront detection accuracy and speed.

4. In the circular common-path point diffraction interference wavefront sensor of the present invention, the reference wave is expanded by the telescope system consisting of the first Fourier lens and the second Fourier lens, namely, the reference plane wave from the pinhole diffraction of the reference pinhole is expanded. Accordingly, the ideal reference plane wave can be obtained by the reference pinhole with bigger aperture. Therefore, compared with the conventional point diffraction interferometer, the circular common-path point diffraction interference wavefront sensor of the present invention is not strict to the pinhole, and also improves the utilization of light.

5. The circular common-path point diffraction interference wavefront sensor of the present invention adopts the circular common-path structure and has no special reference beam, so it is insensitive to the environmental factors and has the strong seismic stability. It is adapted for different wavefront phase dynamic detection fields under the bad operational environment. Simultaneously, the measured data of the interference fringes directly react to the phase information of the tested wavefront without any wavefront reconstruction process. Therefore, the point diffraction interferometer of the present invention is more adapted for all kinds of wavefront phase static and dynamic high-precision detection fields.

These and other objectives, features, and advantages of the present invention will become apparent from the following detailed description, the accompanying drawings, and the appended claims.

Figure 1:
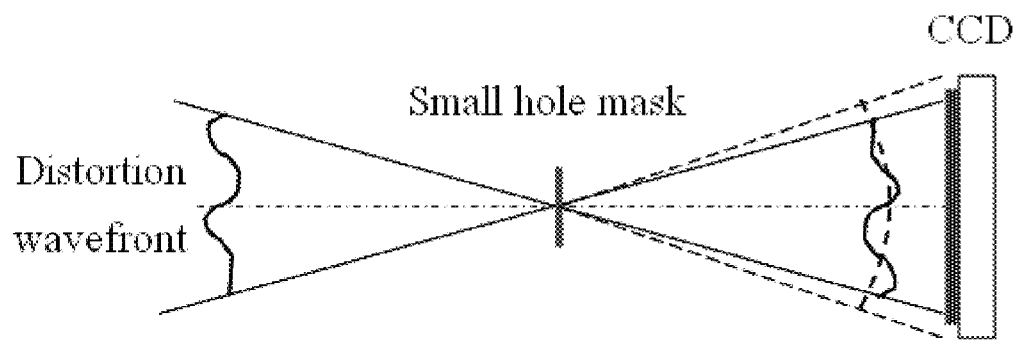
FIG. 1 is a schematic view of a conventional point diffraction interferometer of prior art.

In the drawings, 1: optical matching system, 2: beam-splitter, 3: first reflection mirror, 4: first Fourier lens, 5: two-pinhole mask, 6: second Fourier lens, 7: second reflection mirror, 8: CCD detector, 9: computer system, 10: testing window, 11: reference pinhole.

DETAILED DESCRIPTION OF THE PREFERRED EMBODIMENT

The present invention is further explained in detail with the accompanying drawings.

Figure 2:
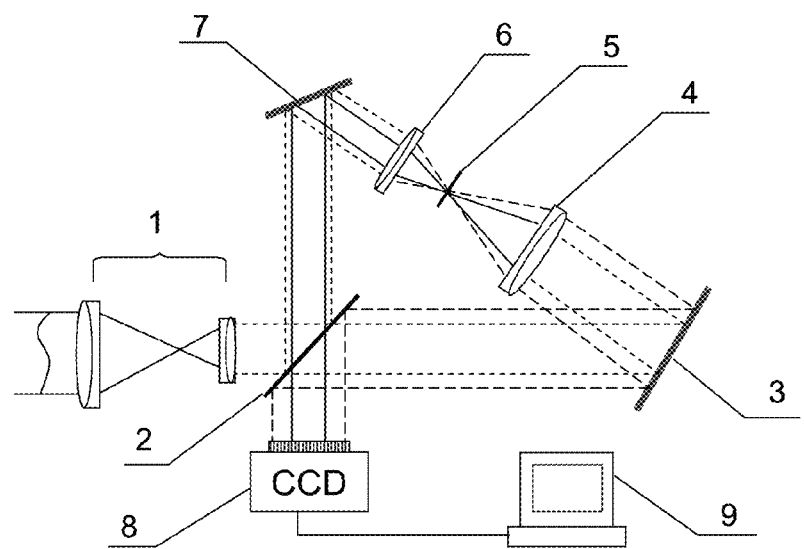
FIG. 2 is a schematic view of a circular common-path point diffraction interference wavefront sensor according to a first preferred embodiment of the present invention.
Figure 3:
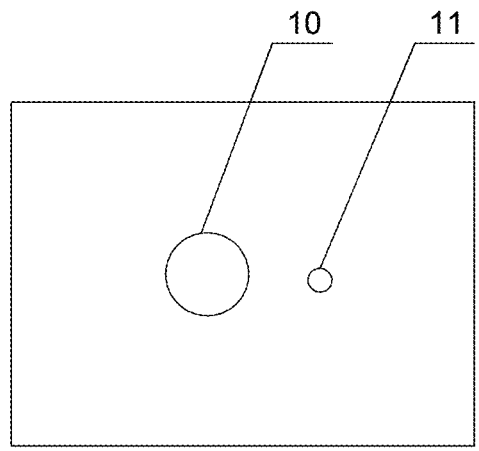
FIG. 3 is schematic view of two-pinhole mask of the circular common-path point diffraction interference wavefront sensor according to the first preferred embodiment of the present invention.

Referring to FIG. 2 of the drawings, a circular common-path point diffraction interference wavefront sensor according to a preferred embodiment of the present invention is illustrated, wherein the circular common-path point diffraction interference wavefront sensor comprises: an optical matching system 1, a beam-splitter 2, a first reflection mirror 3, a second reflection mirror 7, a first Fourier lens 4, a second Fourier lens 6, a charge-coupled device (CCD) detector 8, and a computer system 9. According the preferred embodiment of the present invention, the circular common-path point diffraction interference wavefront sensor further comprises a two-pinhole mask 5, having a reference pinhole 11 and a testing window 10, which is placed at a confocal plane of a telescope system consisting of the first Fourier lens 4 and the second Fourier lens 6. The two-pinhole mask 5 is shown in FIG. 3. The optical path is described as follows. A testing beam from the optical matching system 1 is divided into two beams through the beam-splitter 2. The transmitted beam is reflected by the first reflection mirror 3, and then enters into the first Fourier lens 4 and directly passes through the testing window 10 of the two-pinhole mask 5 with almost no attenuation, and then enters into the second Fourier lens 6 forming the reduced beam, and then is reflected by the second reflection mirror 7, and then returns again to the beam-splitter 2 as the signal wave. The reflected beam reflected by the beam-splitter 2 is reflected by the second reflection mirror 7, and then enters into the second Fourier lens 6, and then make the pinhole diffraction at a focal plane of the second Fourier lens 6 by the reference pinhole on the two-pinhole mask 5, and then is expanded by the first Fourier lens 4, and then is reflected by the first reflection mirror 3, and then is reflected again by the beam-splitter 2 as the reference wave. The signal wave and the reference wave produce the interference at the superposition region thereof forming the interference fringes. By adjusting the tilt angle of the beam-splitter 2, the spatially linear carrier frequency is introduced between the signal wave and the reference wave. Finally, the spatial carrier frequency interference fringes containing all information of the wavefront under test phase are received by the CCD detector 8 and then sent to the computer system 9 for processing.

The complex amplitude of the testing beam is expressed by a formula of $E(x_0,y_0)=u(x_0,y_0)\exp[i\phi(x_0,y_0)]$. The testing beam is divided into two beams by the beam-splitter 2. The transmitted beam passes through the first Fourier lens 4, the testing window 10 and the second Fourier lens 6 in turn, so that the reduced beam is formed as the signal wave which can be expressed by a formula of:

$$E_S(x,y)=u_S(x,y)\exp[i\phi_S(x,y)]|_{x=mx_0,y=my_0} \quad (1)$$

Here, $m=f_1/f_2 \geq 1$, $f_1$ and $f_2$ are respectively the focal lengths of the first Fourier lens 4 and the second Fourier lens 6. However, the reflected beam passes through the second Fourier lens 6, the reference pinhole 11 and the first Fourier lens 4 in turn, so that the enlarged beam is formed as the reference wave. According to the Fourier optical theory, the reference wave at the imaging plane can be expressed by a formula of:

$$E_R(x, y) = IFT\left\{FT\left[E\left(\frac{x_0}{m}, \frac{y_0}{m}\right)\right] \cdot T_{sp}\right\} \quad (2)$$

Here, "FT" and "IFT" denote respectively the Fourier transform and inverse Fourier transform; $T_{sp}$ denotes the transmittance function of the reference pinhole 11. It is convenient for the formula (2) to be expressed as a formula of:

$$E_R(x,y)=u_R(x,y)\exp[\phi_R(x,y)]|_{x=x_0/m, y=y_0/m} \quad (3)$$

Here, $u_R(x,y)$ and $\phi_R(x,y)$ respectively denote the amplitude of the reference wave and the phase distribution of the reference wave.

According to the optical interference theory, the interference fringes form at the region where the signal wave and the reference wave overlap with each other. Accordingly, the intensity of the carrier frequency interference fringes which are received by the CCD detector 8 can be expressed by a formula of:

$$g(mx_0, my_0) = |E_S(x, y) + E_R(x, y)|^2 \quad (4)$$

$$= u_S^2(mx_0, my_0) + u_R^2\left(\frac{x_0}{m}, \frac{y_0}{m}\right) +$$

$$2u_S(mx_0, my_0)u_R\left(\frac{x_0}{m}, \frac{y_0}{m}\right) \times$$

$$\cos\left[2\pi\kappa(mx_0, my_0) + \phi_S(mx_0, my_0) + \phi_R\left(\frac{x_0}{m}, \frac{y_0}{m}\right)\right]$$

Here, $$\phi_R\left(\frac{x_0}{m}, \frac{y_0}{m}\right)$$

denotes the reference wavefront phase after the pinhole diffraction and can be regarded as the ideal plane wave, so it can be directly ignored. $\kappa(mx_0,my_0)=\sin\theta/\lambda$ denotes the spatial carrier frequency introduced by the angle $\theta$ between the reference wave and the signal wave.

To facilitate the following analysis, the superposition region $(mx_0, my_0)$ is defined to be the new domain $(x,y)$. Therefore, the formula (4) can be expressed as below.

$$g(x,y)=a(x,y)+b(x,y)\cos[2\pi(\kappa_{0x}x+\kappa_{0y}y)+\phi_S(x,y)] \quad (5)$$

Here, $$a(x, y) = u_S^2(x, y) + u_R^2\left(\frac{x}{M}, \frac{y}{M}\right) \text{ and}$$

$$b(x, y) = 2u_S(x, y)u_R\left(\frac{x}{M}, \frac{y}{M}\right)$$

denote respectively the background intensity and the modulation function of the interference fringes; $\kappa_{0x}$ and $\kappa_{0y}$ are respectively spatial carrier frequency components at x and y directions; $M=m^2$ denotes the magnification of the circular common-path point diffraction interference wavefront sensor; $\phi_S(x,y)$ denotes the wavefront phase of signal wave.

The interference fringes in the present invention are the spatial carrier frequency interference fringes which contain the phase information of the tested wavefront. By the spatial phase modulation technology, the method of extracting the tested wavefront phase distribution from the interference fringes comprises the steps as follows.

(1) Pretreat the received interference fringes, wherein the pretreatment comprises the steps of de-noising the interference fringes, intercepting the effective parts of the interference fringes and interference fringe extrapolation.

(2) Obtain the spectral distribution of the interference fringes by making the Fourier transform to the pretreated interference fringes, and then make the spectral filtering in the frequency domain to filter out the first-order spectral component.

To facilitate analyzing, the formula (5) is rewritten as below.

$$g(x,y)=a(x,y)+c(x,y)\exp[i2(\kappa_{0x}x+\kappa_{0y}y)]+c^*(x,y)\exp[-i2(\kappa_{0x}x+\kappa_{0y}y)] \quad (6)$$

Here, "*" denotes the conjugation, and $$c(x,y)=\tfrac{1}{2}b(x,y)\exp[i\phi_S(x,y)] \quad (7)$$

Make the Fourier transform to the formula (6), thereby obtaining a formula as below.

$$G(\kappa_x,\kappa_y)=A(\kappa_x,\kappa_y)+C(\kappa_x-\kappa_{ox},\kappa_y-\kappa_{oy})+C^*(\kappa_x+\kappa_{ox},\kappa_y+\kappa_{oy}) \quad (8)$$

Here, $G(\kappa_x,\kappa_y)$, $A(\kappa_x,\kappa_y)$, $C(\kappa_x\kappa_{ox},\kappa_y-\kappa_{oy})$ and $C^*(\kappa_x-\kappa_{ox},\kappa_y-\kappa_{oy})$ are respectively the results of the Fourier transform to four items in formula (6). Then, make the spectral filtering in the frequency domain to filter out the first-order spectral component $C(\kappa_x-\kappa_{ox},\kappa_y-\kappa_{oy})$.

(3) Move the first-order spectral component $C(\kappa_x-\kappa_{ox},\kappa_y-\kappa_{oy})$ obtained in the step (2) to the spectrum zero position to obtain $C(\kappa_x,\kappa_y)$, and then make the Fourier transform to the obtained $C(\kappa_x,\kappa_y)$ to obtain the complex amplitude modulation transfer function $c(x,y)$ of the interference fringes as below.

$$c(x,y)=IFT\{C(\kappa_x,\kappa_y)\} \quad (9)$$

Here, "IFT" denotes the inverse Fourier transform. Combined with formula (7), the testing wavefront phase $\phi_S(x,y)$ is obtained as below.

$$\phi_S(x, y) = \text{unwrap}\left\{\tan^{-1}\left\{\frac{\text{Im}[c(x, y)]}{\text{Re}[c(x, y)]}\right\}\right\} \quad (10)$$

Here, unwrap { } denotes the phase unwrapping operation, "Im" and "Re" respectively denote the operations of the imaginary part and the real part of the complex.

The reference pinhole 11 on the two-pinhole mask 5 must be small enough, and in general, whose size is the magnitude of Airy disc diameter. However, in the present invention, the reference wave is expanded by the Keplerian telescope system composed of the first Fourier lens 4 and the second Fourier lens 6, namely, the reference plane wave after the pinhole diffraction of the reference pinhole is expanded by the Keplerian telescope system. Also, the ideal reference plane wave can be obtained by the reference pinhole having a lager aperture. Therefore, compared with the conventional point diffraction interferometer, it is not so strict to the pinhole in the present invention. Simultaneously, the present invention also improves the light utilization.

The contrast ratio of the interference fringes relates to the transmittance T of the beam-splitter, the reflectivity R of the beam-splitter, the focal length $f_1$ of the first Fourier lens, the focal length $f_2$ of the second Fourier lens, and light through rate of the pinhole is $\eta$ when the reference pinhole 11 generates the pinhole diffraction. Furthermore, define $$M = m^2 = \left(\frac{f_1}{f_2}\right)^2$$

as the amplification of the circular common-path point diffraction interference wavefront sensor. The contrast ratio γ of the interference fringes can be expressed by a formula as below.

$$\gamma = \frac{2\sqrt{\eta}\, RTM}{T^2 M^2 + \eta R^2} \qquad (11)$$

To obtain the maximum contrast ratio of the interference fringes (γ=1), the parameters mentioned above in the formula (11) should meet:

$$\sqrt{\eta} R = TM \qquad (12)$$

Embodiment 1

In the first embodiment of the present invention, the wavefront phase of the He—Ne laser with the wavelength of 632.8 nm is detected. The optical matching system 1 adopts the telescope system whose amplification is 5. The beam-splitter 2 adopts the single wavelength plate beam-splitter with the wavelength of 632.8 nm and the ratio of transmittance to reflectance 2:8. The first reflection mirror 3 and the second reflection mirror 7 are the laser line dielectric HR Mirrors with the wavelength of 632.8 nm. To eliminate the extra wavefront distortion introduced by the Fourier lens, the first Fourier lens 4 and the second Fourier lens 6 are respectively the achromatic positive Fourier lens with a focal length of $f_1$=200 mm and $f_2$=100 mm. The reference pinhole 11 of the two-pinhole mask 5 has an aperture diameter of 80 µm. The testing window 10 adopts the small round hole with an aperture of 1.04 mm. The CCD detector 8 adopts the area array CCD detector with a model of MVC-II 1M and a pixel of 1024×1280. The computer system 9 is the PC computer.

All elements are connected with each other as shown in FIG. 2. When the wavefront phase of He—Ne laser is detected, the matching of the laser beams with different aperture sizes is achieved by the testing beam via the optical matching system 1. The matched laser beam is divided into two beams. The transmitted light is reflected by the first reflection mirror 3, and then enters into the first Fourier lens 4, and then directly passes through the testing window of the two-pinhole mask 5 at a focal plane of the first Fourier lens 4 with almost no attenuation, and then enters into the second Fourier lens 6 forming the reduced beam, and then is reflected by the second reflection mirror 7, and then is transmitted again by the beam-splitter 2 as the signal wave of the tested beam. The difference between the transmitted light and the reflected light is described as follows. The reflected beam reflected by the beam-splitter 2 is reflected by the second reflection mirror 7, and then enters into the second Fourier lens 6, and then make the pinhole diffraction by the reference pinhole on the two-pinhole mask 5 forming the approximately ideal spherical wave, and then the spherical wavefront is expanded as a approximately ideal plane wave by the first Fourier lens 4, and then the expanded plane wave is reflected by the first reflection mirror 3, and then is reflected again by the beam-splitter 2 as the reference wave. The reduced signal wave and the enlarged reference wave make the interference at the superposition region thereof forming the interference fringes. By adjusting the tilt angle of the beam-splitter 2, the spatial phase modulation angle of the formed spatial carrier frequency interference fringe is about 45-degree. The obtained spatial carrier frequency interference fringes containing all phase information of the tested wavefront phase are received by the CCD detector 8 and then sent to the computer system 9 for processing.

Figure 4:
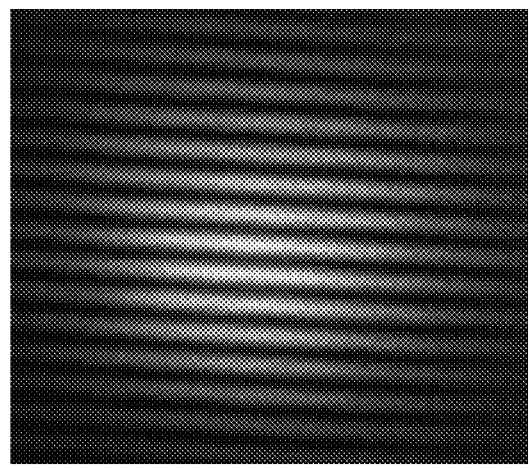
FIG. 4 shows the spatial carrier frequency interference fringes collected by a CCD detector in the actual experiment.
Figure 5:
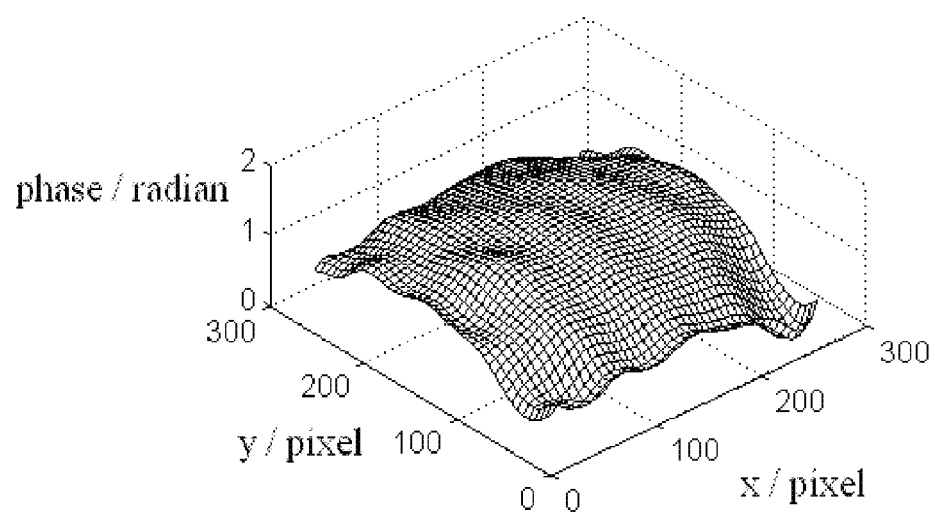
FIG. 5 is a three-dimensional distribution chart of the laser wavefront phase obtained in the actual experiment.

FIG. 4 shows the interference fringes of the spatial carrier frequency collected by the CCD detector 8 in the actual measurement. By the spatial phase modulation technology, the computer deals with the collected interference fringes of the spatial carrier frequency, thereby obtaining the three-dimensional distribution of the wavefront phase of He—Ne laser beam in the actual measurement, as shown in FIG. 5.

Embodiment 2

The second embodiment of the present invention discloses another optical path structure different from the optical path structure described in the first embodiment of the present invention. The optical matching system 1 adopts the telescope system whose amplification is adjustable. The beam-splitter 2 adopts the single wavelength plate beam-splitter with the wavelength of 632.8 nm and the ratio of transmittance to reflectance 8:2. The first reflection mirror 3 and the second reflection mirror 7 are the laser line dielectric HR Mirrors with the wavelength of 632.8 nm. To eliminate the extra wavefront distortion introduced by the Fourier lens 4, the first Fourier lens 4 and the second Fourier lens 6 are respectively the achromatic positive Fourier lens with a focal length of $f_1$=100 mm and $f_2$=200 mm. The reference pinhole 11 of the two-pinhole mask 5 has an aperture of 80 µm. The testing window 10 adopts the small square hole with an aperture of 1.00 mm. The CCD detector 8 adopts the area array CCD detector with a model of MVC-II 1M and a pixel of 1024×1280. The computer system 9 is the PC computer.

Figure 6:
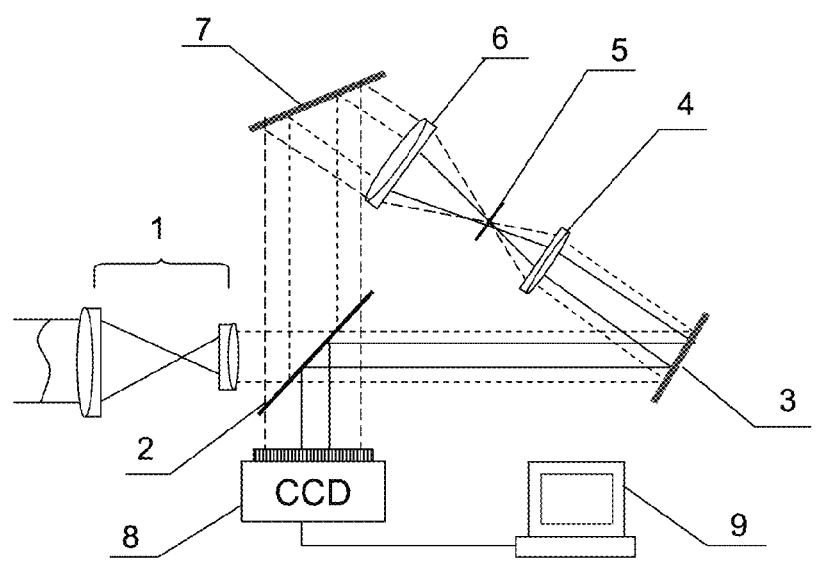
FIG. 6 is a schematic view of a circular common-path point diffraction interference wavefront sensor according to a second preferred embodiment of the present invention.

All elements are connected with each other as shown in FIG. 6. The difference between the optical path of the second embodiment and that of the first embodiment of the present invention is described as follows. When the wavefront phase of the laser is detected, the matching of the laser beams with different aperture sizes is achieved by the testing beam via the optical matching system 1. The matched laser beam is divided into two beams by the beam-splitter 2. The transmitted light is reflected by the first reflection mirror 3, and then enters into the first Fourier lens 4, and then makes the pinhole diffraction at a focal plane of the first Fourier lens 4 by the reference pinhole 11 on the two-pinhole mask 5, forming the approximately ideal spherical wavefront. The spherical wavefront is transformed to the enlarged approximately ideal plane wave by the second Fourier lens 6. The enlarged beam is reflected by the second reflection mirror 7 and then is transmitted again by the beam-splitter 2 as the reference wave of the testing beam. The difference between the transmitted light and the reflected light is described as follows. The reflected light reflected by the beam-splitter 2 passes through the second reflection mirror 7 and completely passes through the testing window 10 of the two-pinhole mask 5, and then passes through the first Fourier lens 4, forming the reduced beam. The reduced beam is reflected by the first reflection mirror 3 and then is reflected by the beam-splitter 2 as the signal wave. The reduced signal wave and the enlarged reference wave interfere at their superposition area, forming the interference fringes. By adjusting the tilt angle of the beam-splitter 2, the spatial phase modulation angle of the formed spatial carrier frequency interference fringes is about 135-degree. Furthermore, the obtained spatial carrier frequency interference fringes containing all information of the wavefront under test phase are collected by the CCD detector 8 and then sent to the computer system 9 for processing. Simultaneously, the distribution of the wavefront phase can be recovered quickly and accurately by dealing with the spatial linear carrier frequency interference fringes, as shown in FIG. 5.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A circular common-path point diffraction interference wavefront sensor, comprising:
    an optical matching system, a beam-splitter, a first reflection mirror, a second reflection mirror, a first Fourier lens, a second Fourier lens, a charge-coupled device (CCD) detector, a computer system, and a two-pinhole mask having a reference pinhole and a testing window,
    wherein said two-pinhole mask is placed at a confocal plane of a telescope system consisting of said first Fourier lens and said second Fourier lens,
    wherein a testing beam from said optical matching system is divided into two beams, named transmitted beam and reflected beam through said beam-splitter,
    wherein said transmitted beam is reflected by said first reflection mirror, and then enters into said first Fourier lens and passes through said testing window of said two-pinhole mask at a focal plane of said first Fourier lens, and then enters into said second Fourier lens forming a reduced beam, said reduced beam is reflected by said second reflection mirror and then returns again to said beam-splitter as a signal wave,
    wherein said reflected beam is reflected by said second reflection mirror, and then enters into said second Fourier lens and makes a pinhole diffraction by said reference pinhole on said two-pinhole mask at said focal plane of said second Fourier lens, and then is expanded by said first Fourier lens, and then is reflected by said first reflection mirror, and then is reflected again by said beam-splitter as a reference wave,
    wherein said signal wave and said reference wave interfere at a superposition region thereof forming interference fringes.

2. The circular common-path point diffraction interference wavefront sensor, as recited in claim 1, wherein said beam-splitter is a plate beam-splitter or a beam-splitter cubes.

3. The circular common-path point diffraction interference wavefront sensor, as recited in claim 1, wherein said reference pinhole of said two-pinhole mask has an aperture of a magnitude of Airy disc diameter.

4. The circular common-path point diffraction interference wavefront sensor, as recited in claim 2, wherein said reference pinhole of said two-pinhole mask has an aperture of a magnitude of Airy disc diameter.

5. The circular common-path point diffraction interference wavefront sensor, as recited in claim 1, wherein said testing window of said two-pinhole mask is a round or square hole.

6. The circular common-path point diffraction interference wavefront sensor, as recited in claim 5, wherein said testing window of said two-pinhole mask has an aperture of 0.2-2 mm.

7. The circular common-path point diffraction interference wavefront sensor, as recited in claim 1, wherein said first reflection mirror and said second reflection mirror are laser line dielectric HR Mirrors.

8. The circular common-path point diffraction interference wavefront sensor, as recited in claim 4, wherein said first reflection mirror and said second reflection mirror are laser line dielectric HR Mirrors.

9. The circular common-path point diffraction interference wavefront sensor, as recited in claim 1, wherein said first Fourier lens and said second Fourier lens are positive Fourier lenses.

10. The circular common-path point diffraction interference wavefront sensor, as recited in claim 4, wherein said first Fourier lens and said second Fourier lens are positive Fourier lenses.

11. A circular common-path point diffraction interference wavefront sensor, comprising:
    an optical matching system, a beam-splitter, a first reflection mirror, a second reflection mirror, a first Fourier lens, a second Fourier lens, a charge-coupled device (CCD) detector, a computer system, and a two-pinhole mask having a reference pinhole and a testing window,
    wherein said two-pinhole mask is placed at a confocal plane of a telescope system consisting of said first Fourier lens and said second Fourier lens,
    wherein a testing beam from said optical matching system is divided into two beams consisting of a transmitted beam and a reflected beam through said beam-splitter,
    wherein said transmitted beam is reflected by said first reflection mirror, and then enters into said first Fourier lens and make a pinhole diffraction by said reference pinhole of said two-pinhole mask at a focal plane of said first Fourier lens, forming an approximately ideal spherical wave, and then is expanded by said second Fourier lens, forming an enlarged approximately ideal plane wave, and then is reflected by said second reflection mirror, and then is transmitted again by said beam-splitter as a reference wave of said testing beam,
    wherein said reflected beam is reflected by said second reflection mirror, and then enters into said second Fourier lens and completely passes through said testing window of said two-pinhole mask, and then enters into said First Fourier lens forming a reduced beam, and then is reflected by said first reflection mirror, and then is reflected again by said beam-splitter as a signal wave,
    wherein said signal wave and said reference wave interfere at a superposition region thereof forming interference fringes.

12. The circular common-path point diffraction interference wavefront sensor, as recited in claim 11, wherein said beam-splitter is a plate beam-splitter or a beam-splitter cubes.

13. The circular common-path point diffraction interference wavefront sensor, as recited in claim 11, wherein said reference pinhole of said two-pinhole mask has an aperture of a magnitude of Airy disc diameter.

14. The circular common-path point diffraction interference wavefront sensor, as recited in claim 12, wherein said reference pinhole of said two-pinhole mask has an aperture of a magnitude of Airy disc diameter.

15. The circular common-path point diffraction interference wavefront sensor, as recited in claim 11, wherein said testing window of said two-pinhole mask is a round or square hole.

16. The circular common-path point diffraction interference wavefront sensor, as recited in claim 15, wherein said testing window of said two-pinhole mask has an aperture of 0.2-2 mm.

17. The circular common-path point diffraction interference wavefront sensor, as recited in claim 11, wherein said first reflection mirror and said second reflection mirror are laser line dielectric HR Mirrors.

18. The circular common-path point diffraction interference wavefront sensor, as recited in claim 14, wherein said first reflection mirror and said second reflection mirror are laser line dielectric HR Mirrors.

19. The circular common-path point diffraction interference wavefront sensor, as recited in claim 11, wherein said first Fourier lens and said second Fourier lens are positive Fourier lenses.

20. The circular common-path point diffraction interference wavefront sensor, as recited in claim 14, wherein said first Fourier lens and said second Fourier lens are positive Fourier lenses.

* * * * *